(12) United States Patent
Fu et al.

(10) Patent No.: US 10,314,090 B2
(45) Date of Patent: Jun. 4, 2019

(54) ACCESS POINT MANAGEMENT

(71) Applicant: HEWLETT PACKARD ENTERPRISE DEVELOPMENT LP, Houston, TX (US)

(72) Inventors: Jiajia Fu, Beijing (CN); Zhe Ji, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 10 days.

(21) Appl. No.: 15/544,011

(22) PCT Filed: Jan. 18, 2016

(86) PCT No.: PCT/CN2016/071159
§ 371 (c)(1),
(2) Date: Jul. 16, 2017

(87) PCT Pub. No.: WO2016/112869
PCT Pub. Date: Jul. 21, 2016

(65) Prior Publication Data
US 2018/0007721 A1 Jan. 4, 2018

(30) Foreign Application Priority Data

Jan. 16, 2015 (CN) .......................... 2015 1 0022841

(51) Int. Cl.
*H04W 76/12* (2018.01)
*H04W 24/02* (2009.01)
(Continued)

(52) U.S. Cl.
CPC ........... *H04W 76/12* (2018.02); *H04W 24/02* (2013.01); *H04L 69/16* (2013.01); *H04W 84/12* (2013.01);
(Continued)

(58) Field of Classification Search
CPC ..... H04W 76/12; H04W 24/02; H04W 88/12; H04W 92/12; H04W 84/12; H04W 88/08; H04L 69/16
See application file for complete search history.

(56) References Cited

U.S. PATENT DOCUMENTS

2011/0103284 A1\* 5/2011 Gundavelli ............. H04L 12/18
370/312
2012/0127903 A1 5/2012 Estevez et al.
(Continued)

FOREIGN PATENT DOCUMENTS

CN 101795465 A 8/2010
CN 101808014 A 8/2010
(Continued)

OTHER PUBLICATIONS

International Search Report and Written Opinion, International Application No. PCT/CN2016/071159, dated Mar. 24, 2016, pp. 1-6, SIPO.

(Continued)

*Primary Examiner* — Jae Y Lee
(74) *Attorney, Agent, or Firm* — Hewlett Packard Enterprise Patet Department

(57) ABSTRACT

An Access Point (AP) connection device establishes a virtual Inter-Process Communication (IPC) connection with each of a plurality of APs. The AP connection device establishes a Controlling and Provisioning of Wireless Access Points (CAPWAP) tunnel connection with a wireless Access Controller (AC).

12 Claims, 4 Drawing Sheets

(51) Int. Cl.
   *H04W 84/12*   (2009.01)
   *H04W 88/08*   (2009.01)
   *H04W 92/12*   (2009.01)
   *H04L 29/06*   (2006.01)
   *H04W 88/12*   (2009.01)

(52) U.S. Cl.
   CPC ............ *H04W 88/08* (2013.01); *H04W 88/12* (2013.01); *H04W 92/12* (2013.01)

(56) References Cited

U.S. PATENT DOCUMENTS

| | | | | |
|---|---|---|---|---|
| 2013/0077621 | A1* | 3/2013 | Jacob Da Silva | H04L 45/58 370/355 |
| 2015/0223128 | A1* | 8/2015 | Liu | H04W 36/14 370/338 |

FOREIGN PATENT DOCUMENTS

| | | | |
|---|---|---|---|
| CN | 102143045 | A | 8/2011 |
| CN | 102595463 | A | 7/2012 |
| CN | 103338210 | A | 10/2013 |
| CN | 103546915 | A | 1/2014 |
| CN | 103686854 | A | 3/2014 |
| CN | 103747535 | A | 4/2014 |
| CN | 104038360 | A | 9/2014 |

OTHER PUBLICATIONS

International Preliminary Report on Patentability received for PCT Application No. PCT/CN2016/071159, dated Jul. 27, 2017, 5 pages.

* cited by examiner

ACCESS POINT MANAGEMENT

BACKGROUND

A wireless Access Point (AP) is a common device in a wireless local area network (WLAN). The AP acts as a bridge connecting a wireless network to a wired network. The AP may allow a wireless network client to connect to a wired local area network, such as an Ethernet network. A wireless Access Controller (AC) is in charge of managing APs in a WLAN. The may handle tasks such as automatic adjustment of a basic wireless network and support advanced roaming service above the network. The AP and the AC may establish a connection via a Controlling And Provisioning of Wireless Access Points (CAPWAP) tunnel, and interact with each other through CAPWAP messages. A CAPWAP message may be encapsulated in a User Datagram Protocol (UDP) packet.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

Figure 1:
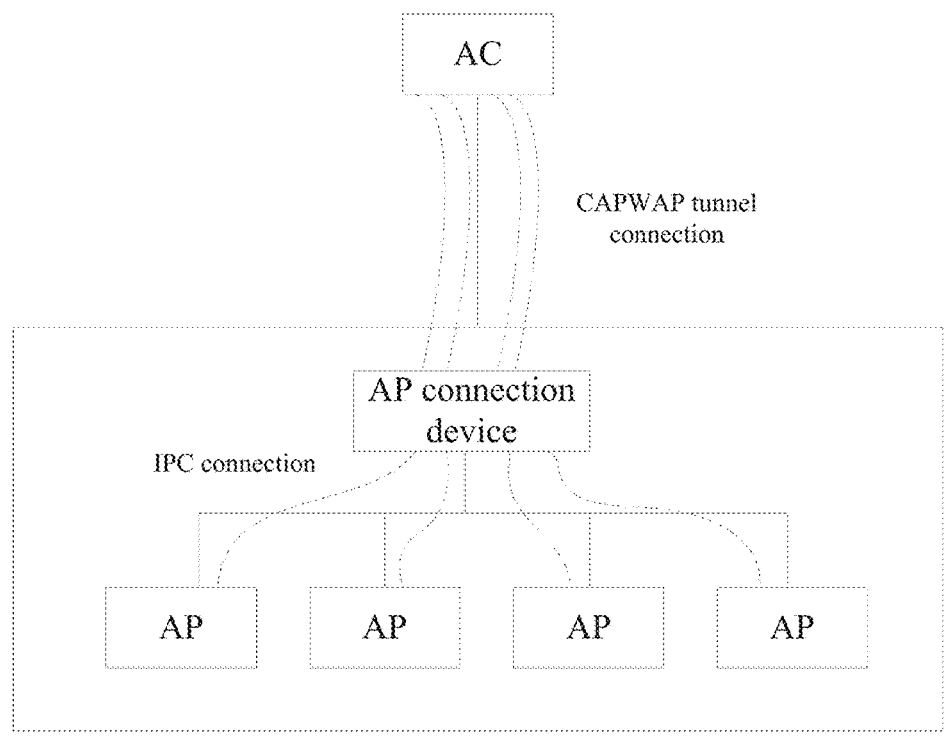
FIG. 1 is a schematic diagram illustrating a system for managing APs according to some examples of the present disclosure.

In a typical WLAN system comprising an Access Controller (AC) controlling a plurality of Access Points (AP), certain local services may be performed by the APs. For example, the local services may include scanning scheduler, neighbor report connector, and so on. Performing these services places certain processing demands on the APs, so relatively expensive high performance APs may be used. As a wireless device, each AP covers a limited area and for large WLANs a large number of APs may be deployed. If all of the APs are high performance APs this can be relatively expensive.

In order to reduce costs, one approach is to have a hierarchical system with multiple ACs. A plurality of APs may connect to a first AC via respective CAPWAP tunnels and the first AC may connect to a second AC via a CAPWAP tunnel. In this arrangement the local service may be centrally processed by the first AC without being separately processed by each AP. This makes it possible to use lower performance APs, thus avoiding deployment of a large number of expensive high performance APs. However, in this approach the first AC still communicates with the APs through CAPWAP messages and the APs terminate the CAPWAP tunnel. After obtaining a CAPWAP message, the first AC parses the CAPWAP message to obtain a payload. So there is still a certain degree of performance demands on the memory and processors of the APs in order that they can handle the CAPWAP.

Furthermore, as mentioned above the CAPWAP is generally encapsulated in a User Datagram Protocol (UDP) packet. The format of a CAPWAP message may be: link header+ IP header+ UDP header+ CAPWAP header+ message element header+ payload. After receiving a CAPWAP message, both the AC and the AP may parse the CAPWAP message to obtain the payload in the CAPWAP message. The combination of CAPWAP and UDP may consume significant network bandwidth and in some cases may make it difficult to provide real time processing of local service and other functions.

In view of this, in an example of the present disclosure, an AP connection device is provided between the AC and the APs, and a virtual Inter-Process Communication (IPC) connections are established between the AP connection device and the APs. The AC may connect to the AP connection device via a CAPWAP tunnel. In this way the CAPWAP tunnel terminates at the AP connection device. This may reduce the processing load on the APs and may reduce the consumption of network bandwidth in AC to AP communications.

A virtual IPC connection is a layer 2 virtual connection. The packet format supported by the IPC connection may be a packet comprising a layer 2 private protocol header and a payload. As such packets sent over an IPC connection may be at layer 2, rather than layer 3 which is used for a UDP encapsulated CAPWAP connection. Further, the structure of the IPC packets may be much simpler than a CAPWAP packet, for example the IPC packet may consist of just a layer 2 private protocol header and a payload. Thus the IPC connection may consume significantly less bandwidth and use less processing power than CAPWAP connections.

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples.

FIG. 1 is a schematic diagram illustrating a system for managing APs according to an example of the present disclosure. As shown in FIG. 1, the system includes an AC, a plurality of APs and an AP connection device which is respectively connected with the AC and the APs. The AP connection device is a device that is to connect with the AC via a CAPWAP tunnel and connect with the APs via a plurality of virtual IPC connections.

The AC may accesses the public network, such as the Internet, and the AP connection device and the APs may form a local network, such as a LAN network.

The AC is to perform various functions, including for example any of the following: aggregating data from different APs and accessing the Internet, accomplishing the configuration management of APs, the authentication and management of wireless user, broadband access, safety control, and the like.

The AP connection device is configured to establish a virtual IPC connection with an AP, and establish a CAPWAP tunnel connection with the AC; receive an IPC packet sent by a AP, forward the IPC packet in the local network or translate the IPC packet into a CAPWAP packet and send the CAPWAP packet to the AC; receive a CAPWAP packet sent by the AC, translate the CAPWAP packet into an IPC packet, and send the IPC packet to a corresponding AP.

In an example, the AP connection device may establish one CAPWAP tunnel connection with the AC, or establish multiple CAPWAP tunnel connections with the AC.

When establishing multiple CAPWAP tunnel connections with the AC, the AP connection device may establish one CAPWAP tunnel connection corresponding to the AP connection device itself between the AP connection device and the AC, and a CAPWAP tunnel connection corresponding to each AP between the AP connection device and the AC; or the AP connection device may establish a CAPWAP tunnel connection corresponding to each AP between the AP connection device and the AC, and not establish the CAPWAP tunnel connection corresponding to the AP connection device itself between the AP connection device and the AC.

In an example, the CAPWAP tunnel connection corresponding to the AP connection device itself between the AP connection device and the AC may be established according to a serial number or a MAC address of the AP connection device sent by the AP connection device. The CAPWAP tunnel connection corresponding to each AP between the AP connection device and the AC may be established according to a serial number or a MAC address of the corresponding AP sent by the AP connection device. In an example, the serial number may be a machine code or an identification number of the device, namely, the serial number is a unique identification of the device, and different devices have different serial numbers.

Because the serial number and the MAC address of each AP are packaged in the CAPWAP tunnel, and a unique source IP address+ a source port is used to identify a corresponding AP at the outer layer of the CAPWAP tunnel, the same AP connection device may establish multiple CAPWAP tunnels. The source IP address is the same one, but the source ports are different, therefore there is no conflict between different CAPWAP tunnels.

In FIG. 1, the solid lines depict the physical connections between the AC and the AP connection device, and the physical connections between the AP connection device and the APs; the dashed lines depict the virtual connections between the AC and the AP connection device, namely the CAPWAP tunnel connections, and the virtual connections between the AP connection device and the APs, namely the virtual IPC connections.

Each AP is configured to send an IPC packet to the AP connection device, and receive an IPC packet forwarded by the AP connection device.

In an example, the AC is further configured to send a latest version file to the AP connection device when determining that version information reported by the AP connection device is lower than the version information stored by the AC, namely, the version of the version file stored by the AP connection device is lower than the version of the version file stored by the AC. Correspondingly, the AP connection device is further configured to report version information of the AP connection device, receive the latest version file sent by the AC, and perform version update; send the latest version file to each AP to enable the AP to perform version update.

Figure 2A:
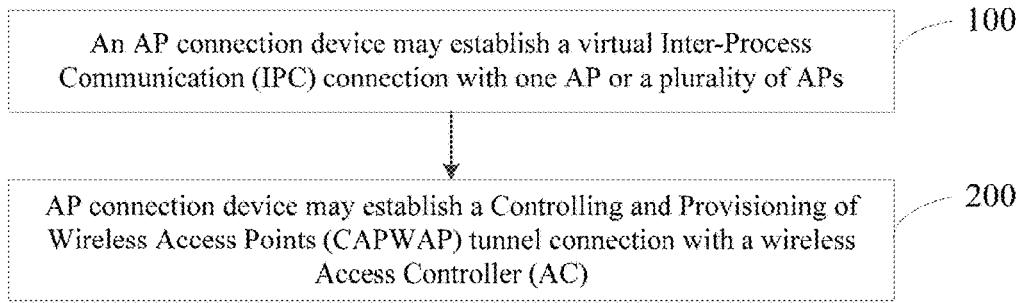
FIG. 2A is a flow diagram illustrating a method for managing APs according to some examples of the present disclosure.
Figure 2B:
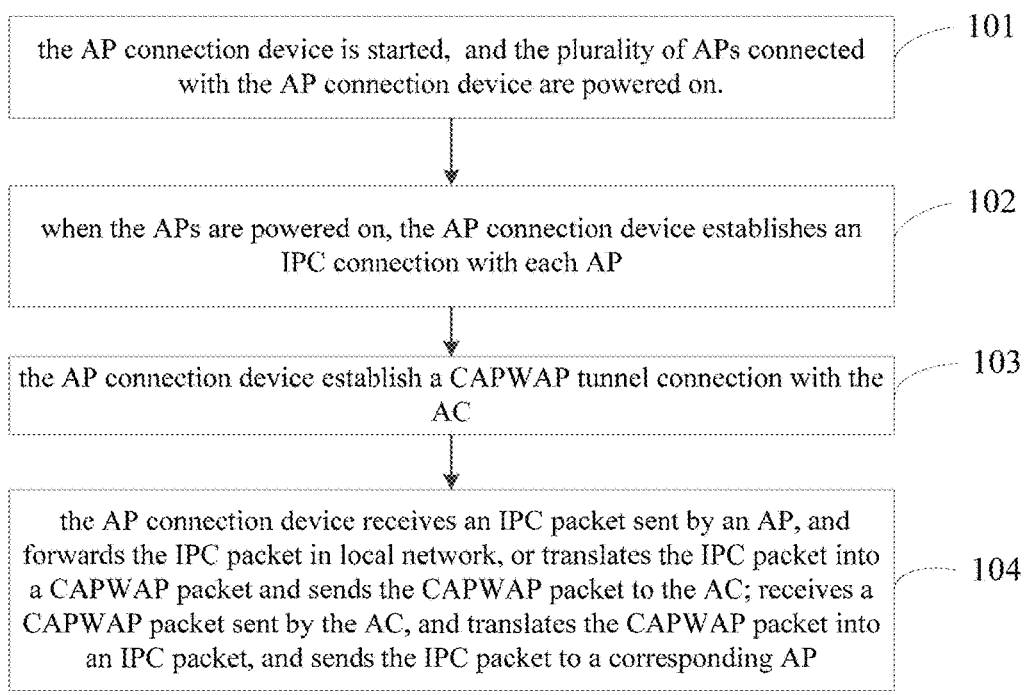
FIG. 2B is a flow diagram illustrating a method for managing APs according to some examples of the present disclosure.

FIG. 2A and FIG. 2B are respectively a flow diagram illustrating a method for managing APs according to an example of the present disclosure. The method may be applied to the system for managing APs shown in FIG. 1.

As shown in FIG. 2A, the method may include the following processes.

An AP connection device may establish a virtual Inter-Process Communication (IPC) connection with one AP or a plurality of APs.

AP connection device may establish a Controlling and Provisioning of Wireless Access Points (CAPWAP) tunnel connection with a wireless Access Controller (AC).

As shown in FIG. 2B, the method may include the following processes.

At block 101, the AP connection device is started, and the plurality of APs connected with the AP connection device are powered on.

In an example, when the AP connection device is started, the AP connection device may record locally stored configuration information including AC address first. For instance, the AP connection device may record locally stored configuration information including AC address into global information. The global information is relative to different AP information. Recording the configuration information including AC address into global information is for subsequent APs to connect the AC. In other words, each of subsequent APs may use the configuration information recorded in global information to establish a connection with the AC.

At block 102, when the APs are powered on, the AP connection device may establish a virtual IPC connection with each AP.

After a virtual IPC connection between the AP connection device and an AP is established, the AP connection device may receive a connection complete notification came from the AP.

In an example, the APs may be powered by the AP connection device. For example, after the AP connection device is started, the APs access the AP connection device and are started. In another example, the APs may be powered by a separate power supply system.

In an example, the process of establishing a virtual IPC connection between the AP connection device and an AP may include: the AP connection device sends a version file of the AP connection device to the AP to enable the AP to load the version file, and after the AP loads the version file, the AP connection device establishes the virtual IPC connection with the AP.

The version file of the AP connection device includes a version file of every AP. That is to say, at block 102, the AP connection device may obtain a version file corresponding to the AP from the version file of the AP connection device according to the type number of the AP, and download the obtained version file to the corresponding AP.

The type numbers of the APs may be different, or be the same, which will not be limited in the present disclosure.

By establishing the virtual IPC connections, services of APs may be centrally processed by the AP connection device, and be taken effect on the APs via the virtual IPC connections. It is not necessary for each AP to separately process the local service.

The virtual IPC connections are layer 2 virtual connections. The packet format supported by the IPC may be: layer 2 private protocol header+ payload. Namely, the payload may be packaged with a short packet header. Compared to the packet header of a CAPWAP message link header+ IP header+ UDP header+ CAPWAP header+ message element header, the virtual IPC connection may save the network bandwidth and CPU consumption of parsing and packaging. In addition, for the AP connection device, layer 2 virtual IPC connections can guarantee that the AP connection device possesses the function of setting APs similar as setting a local chip. On the basis of satisfying the functions of the AP connection device, the performance of the AP connection device may be guaranteed.

At block 103, the AP connection device may establish a CAPWAP tunnel connection with the AC. Thus, the CAPWAP tunnel between the APs and the AC may be terminated on the AP connection device.

In an example, the AP connection device may establish one CAPWAP tunnel with the AC, or establish parallel multiple CAPWAP tunnels with the AC. There is no difference between the depths of the packet parsing (link header, IP header, UDP header, CAPWAP header) whenever it is one CAPWAP tunnel or multiple CAPWAP tunnels. If only one CAPWAP tunnel is established, it is necessary to further distinguish information of different APs in the tunnel. If parallel multiple CAPWAP tunnels are established, due to the processing of one AP is not affected by the processing time of other APs, the processing efficiency of the whole system may be further increased.

Figure 3:
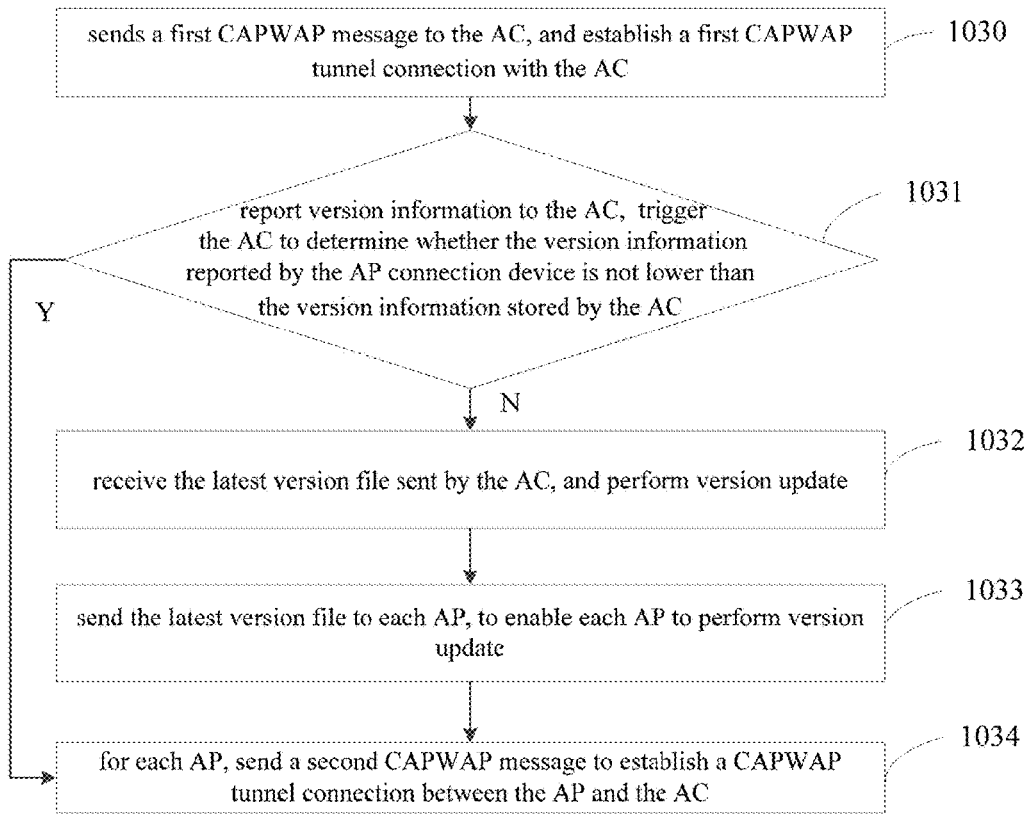
FIG. 3 is a flow diagram illustrating a method for establishing CAPWAP connections by an AP connection device and an AC according to some examples of the present disclosure.

FIG. 3 is a flow diagram illustrating a method for establishing CAPWAP connections by the AP connection device and the AC according to an example of the present disclosure. As shown in FIG. 3, the method may include the following processes.

At block 1030, the AP connection device may send a first CAPWAP message to the AC, and establish a first CAPWAP tunnel connection with the AC.

There are the following two methods for establishing the first CAPWAP connection through the AP connection device.

The first method: the AP connection device may send the AC a first CAPWAP message carrying a serial number and a MAC address of the AP connection device. According to the first CAPWAP message, a CAPWAP tunnel connection corresponding the AP connection device itself is established between the AP connection device and the AC.

The second method: A CAPWAP tunnel connection corresponding to a first AP connected with the AP connection device rather than a CAPWAP tunnel connection corresponding the AP connection device itself is established between the AP connection device and the AC. Namely, it is not necessary for the AP connection device to establish a CAPWAP tunnel connection corresponding to the AP connection device itself between the AP connection device and the AC.

The AP connection device may send the AC a first CAPWAP message carrying a serial number and a MAC address of the first AP connected with the AP connection device. According to the first CAPWAP message, a CAPWAP tunnel connection corresponding to the first AP connected with the AP connection device is established between the AP connection device and the AC.

In an example, in above mentioned method for establishing the first CAPWAP connection, the AC may perform processing according to a normal AP access process without perceiving the existence of the AP connection device.

At block 1031, the AP connection device may report version information to the AC via the first CAPWAP tunnel connection, and trigger the AC to determine whether the version information reported by the AP connection device is not lower than the version information stored by the AC, when the version information reported by the AP connection device is not lower than the version information stored by the AC, namely, when the version of the version file stored by the AP connection device is not lower than the version of the version file stored by the AC, block 1034 is performed; otherwise, block 1032 is performed.

In an example, the AC may perform unified management on a version number and a type number of the AP connection device and a version number and a type number of each AP. The version file stored by the AC corresponds to the version file of the AP connection device, and has a latest version. The version file stored by the AC includes a version file of every AP. The version file of each AP may be obtained from the version file of the AP connection device.

The version information reported by the AP connection device includes: a type number and a version number of the AP connection device itself.

In an example, the AC stores a configuration file corresponding to each serial number or MAC address. In an example, when determining that the version information reported by the AP connection device is not lower than the version information stored by the AC, the AC may search for a configuration file matching the serial number or MAC address carried in the first CAPWAP message, and send a configuration file found out to the AP connection device.

The configuration file may include parameters with which an AP may associate with the AC, such as parameters with which the AP may provide wireless connection including Service Set Identifier (SSID) wireless service. The parameters may include timer configuration, a retransmission number, and so on. In another example, the AC may not send the configuration file, and the AP may use default values.

There may be two methods for sending the configuration file. The first method: based on each CAPWAP message, the AC sends a configuration file corresponding to a serial number or MAC address carried in the CAPWAP message. The second method: based on the first CAPWAP message carrying the serial number or MAC address of the AP connection device itself, the AC may send configuration files each of which corresponding to a serial number of MAC address of one of all APs connected with the AP connection device to the AP connection device, and then the AP connection device may in turn send each configuration file to the corresponding AP.

At block 1032, the AP connection device may receive the latest version file sent by the AC, and perform version update, after the version update is accomplished, block 1033 is performed.

In an example, when the version file is updated, the AP connection device will be restarted. When the APs are powered by the AP connection device, the APs will be restarted while the AP connection device is restarted. Therefore, when the AP connection device is restarted, it is not necessary for the AP connection device to notify the APs of being restarted.

At block 1033, the AP connection device may send the latest version file to each AP, to enable each AP to perform version update, and after the version update is accomplished, block 1034 is performed.

The AP connection device may obtain a version file corresponding to an AP from the latest version file according to a type number of the AP, and send the obtained version file to the corresponding AP.

At block 1034, for each AP, the AP connection device may respectively send a second CAPWAP message to establish a CAPWAP tunnel connection corresponding to the AP between the AP connection device and the AC. Each second CAPWAP message carries a serial number and a MAC address of an AP.

As for how a CAPWAP tunnel connection is established according to the serial number or a MAC address of the AP, those skilled in the art may obtain according to existing methods, nu further descriptions will be given here.

In an example, corresponding to the first method for sending the configuration file, at block 1034, the AC may send a configuration file corresponding to the serial number or MAC address of the AP carried in the second CAPWAP message to the AP connection device, and the AP connection device may send the configuration file to corresponding AP.

If the total number of APs is N, when adopting the first method for establishing the first CAPWAP tunnel connection, after block 1034 is performed, N+1 CAPWAP tunnel connections will be established, that is to say, N CAPWAP tunnel connections each of which corresponds to one of APs connected with the AP connection device are established, and one CAPWAP tunnel connection corresponding to the AP connection device is established. when adopting the second method for establishing the first CAPWAP tunnel connection, after block 1034 is performed, N CAPWAP tunnel connections will be established, that is to say, N CAPWAP tunnel connections each of which corresponds to one of APs connected with the AP connection device are established, and no CAPWAP tunnel connection corresponding to the AP connection device is established.

At block 104, the AP connection device may receive an IPC packet sent by an AP, and forward the IPC packet in local network, or translate the IPC packet into a CAPWAP packet and send the CAPWAP packet to the AC; receive a CAPWAP packet sent by the AC, and translate the CAPWAP packet into an IPC packet, and send the IPC packet to a corresponding AP.

In an example, receiving an IPC packet sent by an AP, and forwarding the IPC packet in local network, or translating the IPC packet into a CAPWAP packet and sending the CAPWAP packet to the AC, may include: the AP connection device receives an IPC packet sent by an AP, parses the IPC packet and obtains a data packet, according to content of a specified field in the data packet, determines the destination receiver of the IPC packet, if the destination receiver is a local AP, forwards the data packet to the destination AP; if the destination receiver is the AC, packages the data packet into a CAPWAP packet, and sends the CAPWAP packet to the AC; if the destination receiver is a local wired connecting party, forwards the data packet to a corresponding destination port.

In an example, the content of the specified field in the data packet may be a type of the data packet, an address of the data packet, a VLAN identification of the data packet, and the like.

In an example, the AP connection device may establish an Access Control List (ACL) according to the configuration file sent by the AC, and determines the destination receiver of the IPC packet according to a set condition in the ACL.

In an example, receiving a CAPWAP packet sent by the AC, and translating the CAPWAP packet into an IPC packet, and sending the IPC packet to a corresponding AP, may include: the AP connection device receives the CAPWAP packet sent by the AC, parses the CAPWAP packet and obtains the payload, namely a data packet, repackages the data packet into an IPC packet, and sends the IPC packet to the AP.

Examples of the present disclosure also provide a device for managing APs, and the device may execute the method for managing APs shown in FIG. 2. Some details undisclosed in the device examples may refer to the descriptions in the method examples.

Figure 4:
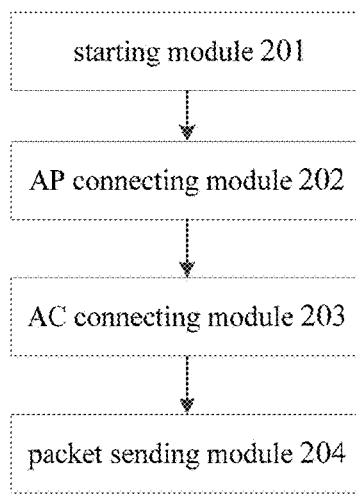
FIG. 4 is a schematic diagram illustrating a device for managing APs according to some examples of the present disclosure.

FIG. 4 is a schematic diagram illustrating a device for managing APs according to some examples of the present disclosure. The device for managing APs may be applied to the AP connection device in the system for managing APs shown in FIG. 1. As shown in FIG. 4, the device may include a starting module 201, an AP connecting module 202, an AC connecting module 203 and a packet sending module 204.

The starting module 201 is configured to, after the AP connection device is started, notify a plurality of APs connected with the AP connection device of being powered on.

In an example, when the AP connection device is started, the AP connection device may record locally stored configuration information including AC address first. For instance, the AP connection device may record locally stored configuration information including AC address into global information.

The AP connecting module 202 is configured to, when the APs are powered on, establish a virtual IPC connection with each of a plurality of APs. After the virtual IPC connection is established, the AP connecting module 202 may indicate the AC connecting module 203 to perform operations, namely, indicate the AC connecting module 203 to establish a CAPWAP tunnel connection with the AC. In an example, after the virtual IPC connection is established, the AP connecting module 202 may receive a connection complete notification sent by the AP, and then the AP connecting module 202 may indicate the AC connecting module 203 to perform operations.

In an example, the APs may be powered by the AP connection device. For example, after the AP connection device is started, the APs access the AP connection device and are started. In another example, the APs may be powered by a separate power supply system.

In an example, the AP connecting module 202 may send a version file of the AP connection device to the AP to enable the AP to load the version file, and after the AP loads the version file, establish the virtual IPC connection with the AP.

By establishing the virtual IPC connections, services of APs may be centrally processed by the AP connection device, and be taken effect on the APs via the virtual IPC connections. It is not necessary for each AP to separately process the local service.

The virtual IPC connections are layer 2 virtual connections. The packet format supported by the IPC may be: layer 2 private protocol header+ payload. Namely, the payload may be packaged with a short packet header. Compared to the packet header of a CAPWAP message link header+ IP header+ UDP header+ CAPWAP header+ message element header, the virtual IPC connection may save the network bandwidth and CPU consumption of parsing and packaging. In addition, for the AP connection device, layer 2 virtual IPC connections can guarantee that the AP connection device possesses the function of setting APs similar as setting a local chip. On the basis of satisfying the functions of the AP connection device, the performance of the AP connection device may be guaranteed.

The AC connecting module 203 is configured to establish a CAPWAP tunnel connection with the AC. Thus, the CAPWAP tunnel between the APs and the AC may be terminated on the AP connection device.

In an example, the AP connecting module 203 may establish one CAPWAP tunnel with the AC, or establish parallel multiple CAPWAP tunnels with the AC. There is no difference between the depths of the packet parsing (link header, IP header, UDP header, CAPWAP header) whenever it is one CAPWAP tunnel or multiple CAPWAP tunnels. If only one CAPWAP tunnel is established, it is necessary to further distinguish information of different APs in the tunnel. If parallel multiple CAPWAP tunnels are established, due to the processing of one AP is not affected by the processing time of other APs, the processing efficiency of the whole system may be further increased.

In the example, it is taken as an example that parallel multiple CAPWAP tunnels are established. If the total number of APs is N, in an example, N+1 CAPWAP tunnel connections will be established, that is to say, N CAPWAP tunnel connections each of which corresponds to one of APs connected with the AP connection device are established, and one CAPWAP tunnel connection corresponding to the AP connection device is established. In another example, N CAPWAP tunnel connections will be established, that is to say, N CAPWAP tunnel connections each of which corresponds to one of APs connected with the AP connection device are established, and no CAPWAP tunnel connection corresponding to the AP connection device is established.

Figure 5:
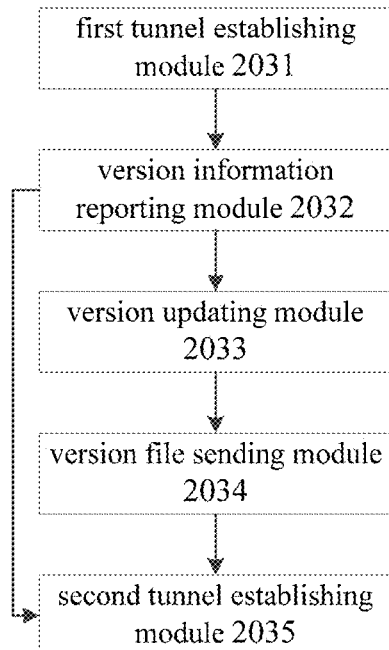
FIG. 5 is a schematic diagram illustrating an AC connection module in the device for managing APs according to some examples of the present disclosure.

The AC connecting module 203 may have multiple implementation structures. FIG. 5 is a schematic diagram illustrating an AC connection module in the device for managing APs according to some examples of the present disclosure. As shown in FIG. 5, the AC connecting module may include a first tunnel establishing module 2031, a version information reporting module 2032, a version updating module 2033, a version file sending module 2034 and a second tunnel establishing module 2035.

The first tunnel establishing module 2031 is configured to send a first CAPWAP message to the AC, and establish a first CAPWAP tunnel connection with the AC.

There are the following two methods for establishing the first CAPWAP connection through the first tunnel establishing module 2031.

The first tunnel establishing module 2031 may send the AC a first CAPWAP message carrying a serial number and a MAC address of the AP connection device. According to the first CAPWAP message, a CAPWAP tunnel connection corresponding to the AP connection device itself is established between the AP connection device and the AC.

The second method: A CAPWAP tunnel connection corresponding to a first AP connected with the AP connection device rather than a CAPWAP tunnel connection corresponding to the AP connection device itself is established. Namely, it is not necessary for the AP connection device to establish a CAPWAP tunnel connection corresponding to the AP connection device itself between the AP connection device and the AC.

The first tunnel establishing module 2031 may send the AC a first CAPWAP message carrying a serial number and a MAC address of the first AP connected with the AP connection device. According to the first CAPWAP message, a CAPWAP tunnel connection corresponding to the first AP connected with the AP connection device is established between the AP connection device and the AC.

The version information reporting module 2032 is configured to report version information to the AC, and trigger the AC to determine whether the version information reported by the version information reporting module is not lower than the version information stored by the AC, when the version information reported by the version information reporting module is not lower than the version information stored by the AC, namely, when the version of the version file stored by the AP connection device is not lower than the version of the version file stored by the AC, indicate the second tunnel establishing module 2035 to perform operations, namely, indicate the second tunnel establishing module 2035 to respectively establish a CAPWAP tunnel connection corresponding to each of APs between the device and the AC; otherwise, indicate the version updating module 2033 to perform operations, namely, indicate the version updating module 2033 to perform version update according to the latest version file sent by the AC.

The version information reported by the version information reporting module 2032 includes: a type number and a version number of the AP connection device itself.

The version updating module 2033 is configured to receive the latest version file sent by the AC, and perform version update, after the version update is accomplished, indicate the version file sending module 2034 to perform operations, namely, indicate the version file sending module 2034 to send the latest version file to each AP.

In an example, when the version updating module 2033 performs the version update, the AP connection device will be restarted. When the APs are powered by the AP connection device, the APs will be restarted while the AP connection device is restarted. Therefore, when the AP connection device is restarted, it is not necessary for the AP connection device to notify the APs of being restarted.

The version file sending module 2034 is configured to send the latest version file received by the version updating module 2033 to each AP to enable each AP to perform version update, and after the version update is accomplished, indicate the second tunnel establishing module 2035 to perform operations, namely, indicate the second tunnel establishing module 2035 to, for each AP, send a second CAPWAP message to the AC to establish a CAPWAP tunnel connection between the AP and the AC.

The second tunnel establishing module 2035 is configured to, for each AP, send a second CAPWAP message to the AC to establish a CAPWAP tunnel connection corresponding to the AP between the AP connection device and the AC.

Each second CAPWAP message carries a serial number and a MAC address of the AP.

As for how a CAPWAP tunnel connection is established according to the serial number or a MAC address of the AP, those skilled in the art may obtain according to existing methods, nu further descriptions will be given here.

In an example, the AC stores a configuration file corresponding to each serial number or MAC address. In an example, when determining that the version information reported by the AP connection device is not lower than the version information stored by the AC, the AC may search for a configuration file matching the serial number or the MAC address according to the serial number or the MAC address carried in the CAPWAP message, and send a configuration file found out to the AP connection device.

There may be two methods for sending the configuration file. The first method: based on each CAPWAP message, the AC sends a configuration file corresponding to a serial number or MAC address carried in the CAPWAP message. The second method: based on the first CAPWAP message carrying the serial number or MAC address of the AP connection device itself, the AC may send configuration files each of which corresponding to a serial number of MAC address of one of all APs connected with the AP connection device to the AP connection device, and then the AP connection device may in turn send each configuration file to the corresponding AP.

The packet sending module 204 is configured to receive an IPC packet sent by an AP, and forward the IPC packet in local network, or translate the IPC packet into a CAPWAP packet and send the CAPWAP packet to the AC; receive a CAPWAP packet sent by the AC, and translate the CAPWAP packet into an IPC packet, and send the IPC packet to a corresponding AP.

In an example, the packet sending module 204 may receive the IPC packet sent by an AP, parse the IPC packet and obtain a data packet, according to content of a specified field in the data packet, determine the destination receiver of the IPC packet, if the destination receiver is a local AP, forward the data packet to the destination AP; if the destination receiver is the AC, package the data packet into a CAPWAP packet, and send the CAPWAP packet to the AC; if the destination receiver is a local wired connecting party, forward the data packet to a corresponding destination port.

The IPC packet includes: layer 2 private protocol header+ payload. The CAPWAP packet includes: link header+ IP header+ UDP header+ CAPWAP header+ message element header+ payload.

Figure 6:
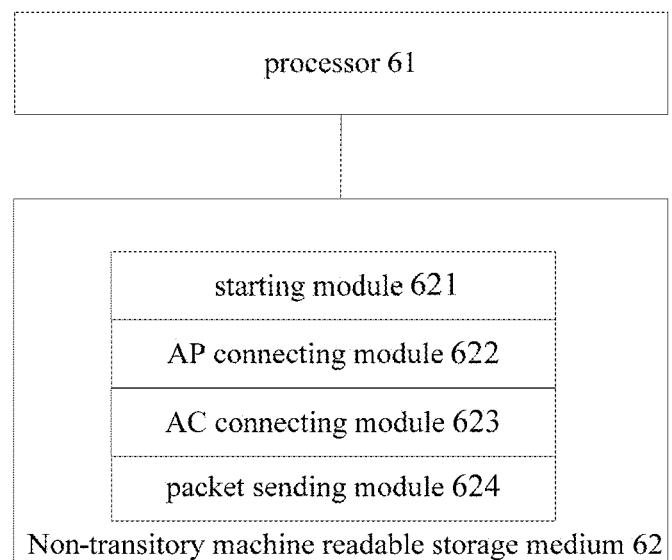
FIG. 6 is a schematic diagram illustrating an AP connection device according to some examples of the present disclosure.

In an example, the packet sending module 204 may receive the CAPWAP packet sent by the AC, parse the CAPWAP packet and obtain the payload, namely a data packet, repackages the data packet into an IPC packet, and send the IPC packet to the AP FIG. 6 is a schematic diagram illustrating an AP connection device according to some examples of the present disclosure. As shown in FIG. 6, the AP connection device may include: a processor 61, a non-transitory machine readable storage medium 62, and program modules stored in the non-transitory machine readable storage medium 62 and executable by the processor 61. The program models may include: a starting module 621, an AP connecting module 622, an AC connecting module 623, and a packet sending module 624.

The functions of each of above mentioned modules may be the same as that described in FIG. 4, and no further descriptions will be given here.

In the method, device and system for managing APs provided by examples of the present disclosure, an AP connection device is configured between the AC and the APs, and a virtual Inter-Process Communication (IPC) connection is established between the AP connection device and the APs for replacing the CAPWAP tunnel connection. Thus the CAPWAP tunnels between the AC and the APs are terminated at the AP connection device, and the communication consumption between services may be reduced.

In addition, due to the CAPWAP tunnel connection between the APs and the first AC is cancelled, the processing of the APs is simplified, and the requirement for AP performance and memory is reduced. That is to say, in an actual application, APs with low-end model may satisfy the user requirement, thus the deployment costs of the whole network may be reduced.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

The above examples may be implemented by hardware, software, firmware, or a combination thereof. For example the various methods, processes and functional modules described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules. Further, the examples disclosed herein may be implemented in the form of a software product. The computer software product is stored in a non-transitory storage medium and comprises a plurality of instructions for making an electronic device implement the method recited in the examples of the present disclosure.

What is claimed is:

1. A method for managing wireless Access Point (AP)s, comprising:
    sending, by AP connection device, a version file of the AP connection device to the AP to enable the AP to load the version file;
    establishing, by an AP connection device, a virtual Inter-Process Communication (IPC) connection with an AP after the AP loads the version file; and
    establishing by the AP connection device, a Controlling and Provisioning of Wireless Access Points (CAPWAP) tunnel connection with a wireless Access Controller (AC).

2. The method according to claim 1, there are a plurality of APs, wherein establishing, by the AP connection device, a CAPWAP tunnel connection with the AC, comprises:
    establishing, by the AP connection device, one CAPWAP tunnel connection with the AC, or
    establishing, by the AP connection device, multiple CAPWAP tunnel connections with the AC.

3. The method according to claim 2, wherein establishing, by the AP connection device, multiple CAPWAP tunnel connections with the AC, comprises:
    establishing, by the AP connection device, one CAPWAP tunnel connection corresponding to the AP connection device itself between the AP connection device and the AC, and a CAPWAP tunnel connection corresponding to each of the plurality of APs between the AP connection device and the AC; or
    establishing, by the AP connection device, a CAPWAP tunnel connection corresponding to each of the plurality of APs between the AP connection device and the AC.

4. The method according to claim 2, wherein establishing, by the AP connection device, a CAPWAP tunnel connection with the AC, further comprises:
    after determining that version information of the AP connection device is lower than version information stored by the AC, receiving, by the AP connection device, a latest version file sent by the AC, and performing version update;

sending, by the AP connection device, the latest version file to each of the plurality of APs to enable each of the plurality of APs to perform version update.

5. The method according to claim 2, wherein, the AP connection device and the AP form a local network; after establishing, by the AP connection device, a CAPWAP tunnel connection with the AC, further comprising:
receiving, by the AP connection device, an IPC packet sent by an AP, forwarding the IPC packet in the local network or translating the IPC packet into a CAPWAP packet and sending the CAPWAP packet to the AC;
receiving, by the AP connection device, a CAPWAP packet sent by the AC, translating the CAPWAP packet into an IPC packet, and sending the IPC packet to a corresponding AP.

6. The method according to claim 5, wherein receiving, by the AP connection device, an IPC packet sent by an AP, forwarding the IPC packet in the local network or translating the IPC packet into a CAPWAP packet and sending the CAPWAP packet to the AC, comprises:
receiving, by the AP connection device, the IPC packet sent by an AP, parsing the IPC packet and obtaining a data packet, according to content of a specified field in the data packet, determining the destination receiver of the IPC packet, if the destination receiver is a local AP, forwarding the data packet to the destination AP; if the destination receiver is the AC, packaging the data packet into a CAPWAP packet, and sending the CAPWAP packet to the AC; if the destination receiver is a local wired connecting party, forwarding the data packet to a corresponding destination port.

7. A device for managing wireless Access Point (AP)s, comprising:
an AP connecting module to send a version file of the device to an AP to enable the AP to load the version file, and establish a virtual Inter-Process Communication (IPC) connection with the AP after the AP loads the version file; and
an AC connecting module to establish a Controlling and Provisioning of Wireless Access Points (CAPWAP) tunnel connection with a wireless Access Controller (AC).

8. The device according to claim 7, wherein, the device and the AP form a local network; the device further comprises:
a packet sending module to receive an IPC packet sent by an AP, and forward the IPC packet in the local network, or translate the IPC packet into a CAPWAP packet and send the CAPWAP packet to the AC; receive a CAPWAP packet sent by the AC, and translate the CAPWAP packet into an IPC packet, and send the IPC packet to a corresponding AP.

9. The device according to claim 8, there are a plurality of APs; wherein the AC connecting module is to establish one CAPWAP tunnel connection corresponding to the device itself between the device and the AC, and a CAPWAP tunnel connection corresponding to each of the plurality of APs between the device and the AC; or
the AC connecting module is to establish a CAPWAP tunnel connection corresponding to each of the plurality of APs between the device and the AC.

10. The device according to claim 9, wherein the AC connecting module comprises:
a first tunnel establishing module to send a first CAPWAP message to the AC, and establish a CAPWAP tunnel connection between the device itself and the AC or establish a CAPWAP tunnel connection between the AC and an AP connected with the device;
a version information reporting module to report version information to the AC, and trigger the AC to determine whether the version information reported by the version information reporting module is not lower than the version information stored by the AC; and
a second tunnel establishing module to when the version information reported by the version information reporting module is not lower than the version information stored by the AC, for each of the plurality of APs each of which has not a corresponding CAPWAP tunnel connection, send a second CAPWAP message to the AC to establish a CAPWAP tunnel connection corresponding to the AP between the device and the AC.

11. The device according to claim 10, wherein the AC connecting module further comprises:
a version updating module to receive a latest version file sent by the AC, and perform version update, after the version update is accomplished, indicate a version file sending module to perform operations; and
the version file sending module to send the latest version file received by the version updating module to each of the plurality of APs to enable each of the plurality of APs to perform version update.

12. The device according to claim 8, wherein the packet sending module is to parse the IPC packet and obtain a data packet, according to content of a specified field in the data packet, determines the destination receiver of the IPC packet, if the destination receiver is a local AP, forward the data packet to the destination AP; if the destination receiver is the AC, package the data packet into a CAPWAP packet, and send the CAPWAP packet to the AC; if the destination receiver is a local wired connecting party, forward the data packet to a corresponding destination port.

* * * * *